June 24, 1924.　　　　　　　　　　　　　　1,498,678
A. P. CHAVRIER
UNIVERSAL JOINT
Filed Oct. 30, 1922　　　　2 Sheets-Sheet 1
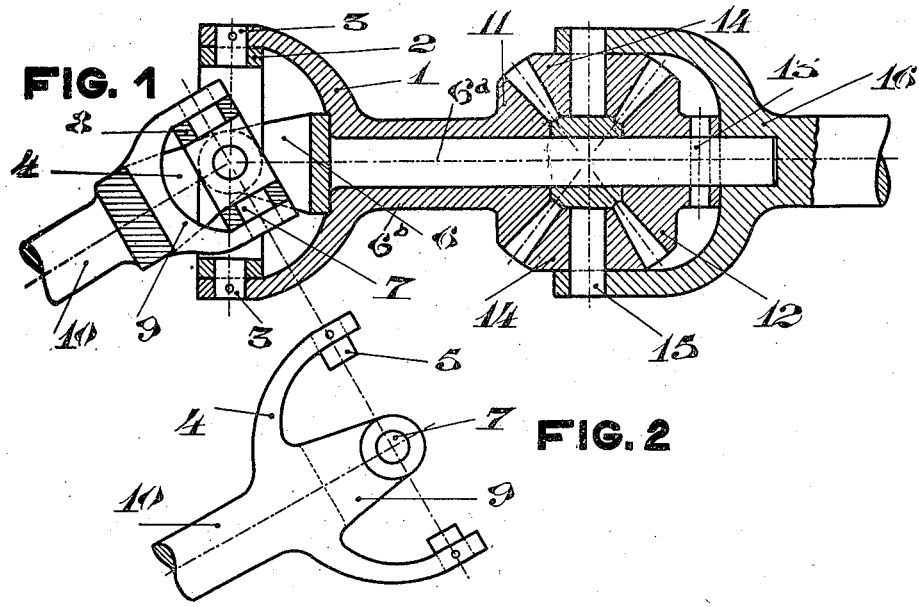
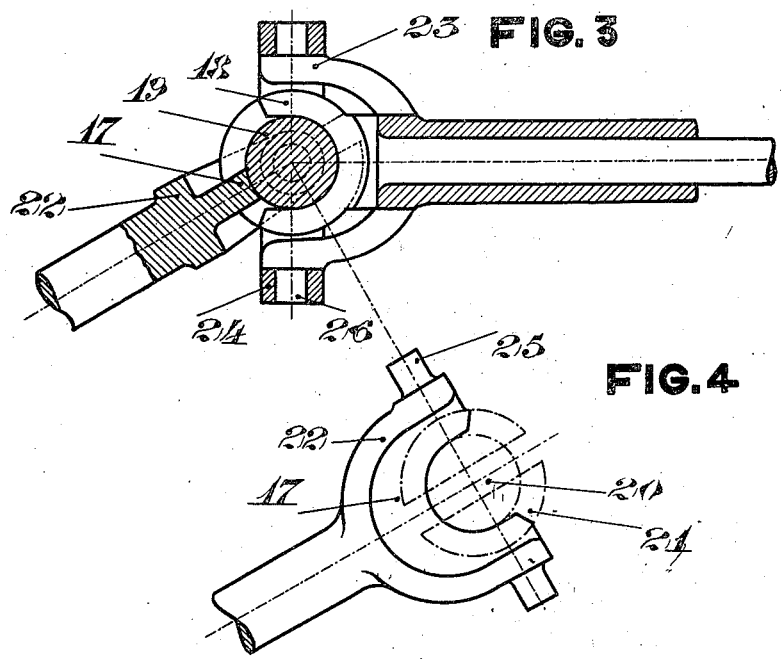
Witnesses
Inventor June 24, 1924. 1,498,678
A. P. CHAVRIER
UNIVERSAL JOINT
Filed Oct. 30, 1922  2 Sheets-Sheet 2
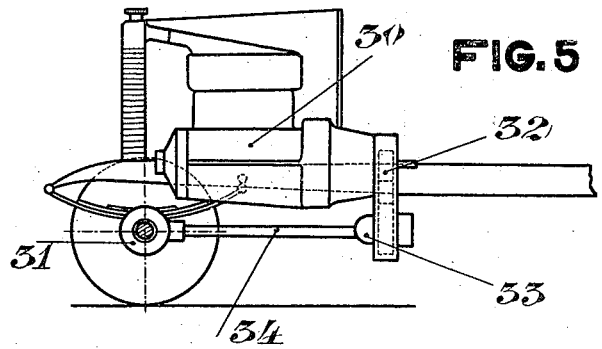
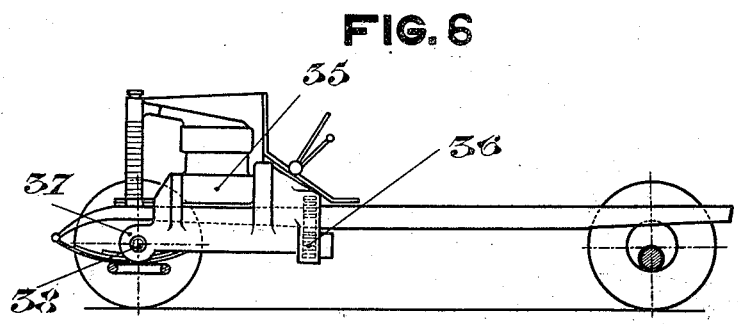
Witnesses
Inventor Patented June 24, 1924.

1,498,678

UNITED STATES PATENT OFFICE.

ANTOINE PIERRE CHAVRIER, OF LYON, FRANCE.

UNIVERSAL JOINT.

Application filed October 30, 1922. Serial No. 597,978.

*To all whom it may concern:*

Be it known that I, ANTOINE PIERRE CHAVRIER, a citizen of the French Republic, residing at Lyon, France, have invented certain new and useful Improvements in Universal Joints, of which the following is a specification.

Cardan joints of the known type do not transmit the rotatory motion from one shaft set at an angle to another without producing variations of angular speed occurring between two maximum and two minimum speeds said variations increasing with the angle which the shafts form between them.

The present invention has for its object a universal joint by which rotatory motion can be transmitted between two shafts forming between them an angle which may be variable or otherwise, while preserving a like angular speed of said shafts, which is strictly uniform at all times, this being so at any point of the revolution considered.

The improved joint is applicable where the ordinary Cardan joint is not suitable, for instance:

(*a*) For driving the front wheels of motor cars having two or four driving and steering wheels.

(*b*) For transmission of the motor force from a main vehicle to the axles of one or more drawn vehicles.

(*c*) For driving the rear axle of a motor car in the case of a single Cardan joint.

(*d*) For driving the screw propellers of boats, aeroplanes or airships, especially when the driven shaft does not lie on the same axis as the motor shaft and which may be required to be displaced during the working of the apparatuses.

The annexed drawings illustrate the invention.

Fig. 1 is a longitudinal section of one form of construction.

Fig. 2 illustrates two forks forming part of the same shaft and set at right angles to one another.

Fig. 3 shows a modification wherein an inner ball joint is used.

Fig. 4 is a view of the double fork used in the construction represented in Fig. 3.

Figs. 5 and 6 diagrammatically illustrate two examples of the application of the invention to a motor car having front driving and steering wheels.

The device is constituted by the union of two concentric joints of the Cardan type. The outer joint is formed on one side by the fork 1 connected to the ring 2 by pivots 3 and on the other side by the fork 4 connected to the same ring 2 by pivots 5 at right angles to the pivots 3 of the fork 1.

The inner joint is constructed in the same manner.

The fork 6 mounted on shaft $6^a$ drives by means of pivots 7 the ring 8 which is also connected to the fork 9 by further pivots such as 7.

As shown in Fig. 2 the forks 4 and 9 set at 90° to each other are both integral with the shaft 10 which drives them.

The fork 1 is connected to the pinion 11 of a differential gear.

The fork 6 or shaft $6^a$ is connected to the planetary wheel 12 by the pin 13.

The planet wheels 14 of this differential gear are mounted on the arms 15 of a crossbar which drives the member 16 at an angular speed always strictly equal to that of the shaft 10.

The shafts $6^b$, $6^a$ carrying the forks 1 and 6 can rotate freely in relation to each other.

This joint is reversible; the driving shaft can equally well be the shaft 16 as the shaft 10.

In the modification shown in Figs. 3 and 4 the inner forks 17 and 18 are driven by a ball 19 having two grooves 20 and 21 at right angles to one another and shown in dotted lines in Fig. 4.

The outer forks 22 and 23 are connected by the ring 24 comprising sockets for the pivots 25 and 26.

In Fig. 5 is diagrammatically represented an example of the application of the invention to a motor car having front driving and steering wheels. The motor 30 secured to the frame, transmits the movement to the steering wheels from the front axle 31, by means of reducing gear 32, and a compensated joint 33. A tube 34 encloses the transmission shaft.

A second example of application is shown in Fig. 6. The motor block 35 comprising the motor, the clutch, the speed change gear, the reducing gear 36, differential gear 37, and the brake, is secured to the frame and transmits the movement to the front wheels through lateral shafts 38 provided with the universal joints.

It is also possible to effect direct engagement by taking a motor block of the standard type which is turned endwise and to which is secured in front the casing containing the differential gear. The wheels can then be driven as indicated in Fig. 6.

In each of these examples the front wheels are individually controlled by a differential compensation joint of one of the types above described, they can be driven either direct from the axle or by means of suitable gearings.

This joint also allows of constructing a vehicle having a single front wheel which is both a driving and steering wheel.

What I claim as my invention and desire to secure by Letters Patent of the United States is:—

1. An universal joint of the character described comprising a fork, a second fork of lesser diameter within said first mentioned fork coaxial therewith and rotatable with respect to the same, a third fork having two pairs of arms at right angles to one another and of which one pair is of greater width than the other pair and a coupling member within said forks and to which the arms of said forks are connected to allow universal movement thereof.

2. An universal joint of the character described comprising a fork, a second fork of lesser diameter within said first mentioned fork coaxial therewith and rotatable with respect to the same, a third fork having two pairs of arms at right angles to one another and of which one pair is of greater width than the other pair, a coupling member within said forks and to which the arms of said forks are connected to allow universal movement thereof, a differential gear the pinions of which are connected to said first mentioned and second forks respectively, a shaft, and arms connecting said shaft to the planetary pinions of said differential gear.

3. An universal driving joint comprising a freely rotatable shaft a fork connected to said shaft, a ring, pivots connecting the arms of said fork to said ring at diametrically opposite points thereof a tubular shaft surrounding said freely rotatable shaft, a fork on the one end of said tubular shaft a second ring surrounding said first mentioned ring, pivots connecting the arms of said last mentioned fork to said second ring, a shaft a four armed fork on the end of said shaft and pivots connecting the arms of said last mentioned fork in pairs to said rings.

In witness whereof I have signed this specification in the presence of two witnesses.

ANTOINE PIERRE CHAVRIER.

Witnesses:
    JULIAN SEMPLE SMEDBERG,
    GUILLAUME PIOCHE.